(12) United States Patent
Zhang (10) Patent No.: US 9,825,970 B2
(45) Date of Patent: Nov. 21, 2017

(54) MANAGING ACCESS TO CONTENT FOR A SPONSORED DATA CAMPAIGN

(71) Applicant: Verizon Patent and Licensing Inc., Arlington, VA (US)

(72) Inventor: Fengping Zhang, Burlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 95 days.

(21) Appl. No.: 14/874,721

(22) Filed: Oct. 5, 2015

(65) Prior Publication Data
US 2017/0099301 A1  Apr. 6, 2017

(51) Int. Cl.
*H04L 29/06* (2006.01)
*H04L 9/32* (2006.01)

(52) U.S. Cl.
CPC .......... *H04L 63/108* (2013.01); *H04L 9/3247* (2013.01); *H04L 9/3268* (2013.01); *H04L 63/0823* (2013.01); *H04L 63/0876* (2013.01); *H04L 63/123* (2013.01)

(58) Field of Classification Search
CPC ... H04L 63/108; H04L 9/3247; H04L 9/3268; H04L 63/0823; H04L 63/0853; H04L 63/0876
See application file for complete search history.

(56) References Cited

U.S. PATENT DOCUMENTS

| | | | | |
|---|---|---|---|---|
| 5,708,780 A | * | 1/1998 | Levergood | G06F 21/41 709/203 |
| 2004/0220975 A1 | * | 11/2004 | Carpentier | G06F 17/30097 |
| 2011/0289316 A1 | * | 11/2011 | Cremin | G06F 21/31 713/168 |
| 2016/0191544 A1 | * | 6/2016 | Kim | H04L 63/123 713/171 |

* cited by examiner

*Primary Examiner* — Tri Tran (57) ABSTRACT

A device may receive a network address and a signature. The network address may be associated with a sponsored data campaign, and the signature may be generated based on a security key and based on the network address. The device may perform a validation operation on the signature to validate that the network address is associated with the sponsored data campaign. The validation operation may be performed based on the security key. The security key may be obtained based on a key identifier. The device may selectively permit or deny access to content associated with the network address based on a result of the validation operation.

20 Claims, 10 Drawing Sheets

MANAGING ACCESS TO CONTENT FOR A SPONSORED DATA CAMPAIGN

BACKGROUND

Service providers, such as online media companies, may wish to deliver content to network users. Some service providers may choose to subsidize the cost of network data usage which would otherwise be paid by the network users accessing the content.

DETAILED DESCRIPTION OF PREFERRED EMBODIMENTS

The following detailed description of example implementations refers to the accompanying drawings. The same reference numbers in different drawings may identify the same or similar elements.

A service provider may want to provide content to a network user. The service provider may want to subsidize the cost of network data usage which would ordinarily be charged to the network user to access the content. A network operator may want a secure method to ensure that the sponsored content is accessed by an appropriate party (e.g., to ensure that a malicious party does not attempt to access the sponsored content without the service provider's permission). Implementations described herein may assist the network operator in providing secure access to sponsored content, and may assist the service provider in preventing unwanted parties from accessing the sponsored content.

Figure 1A:
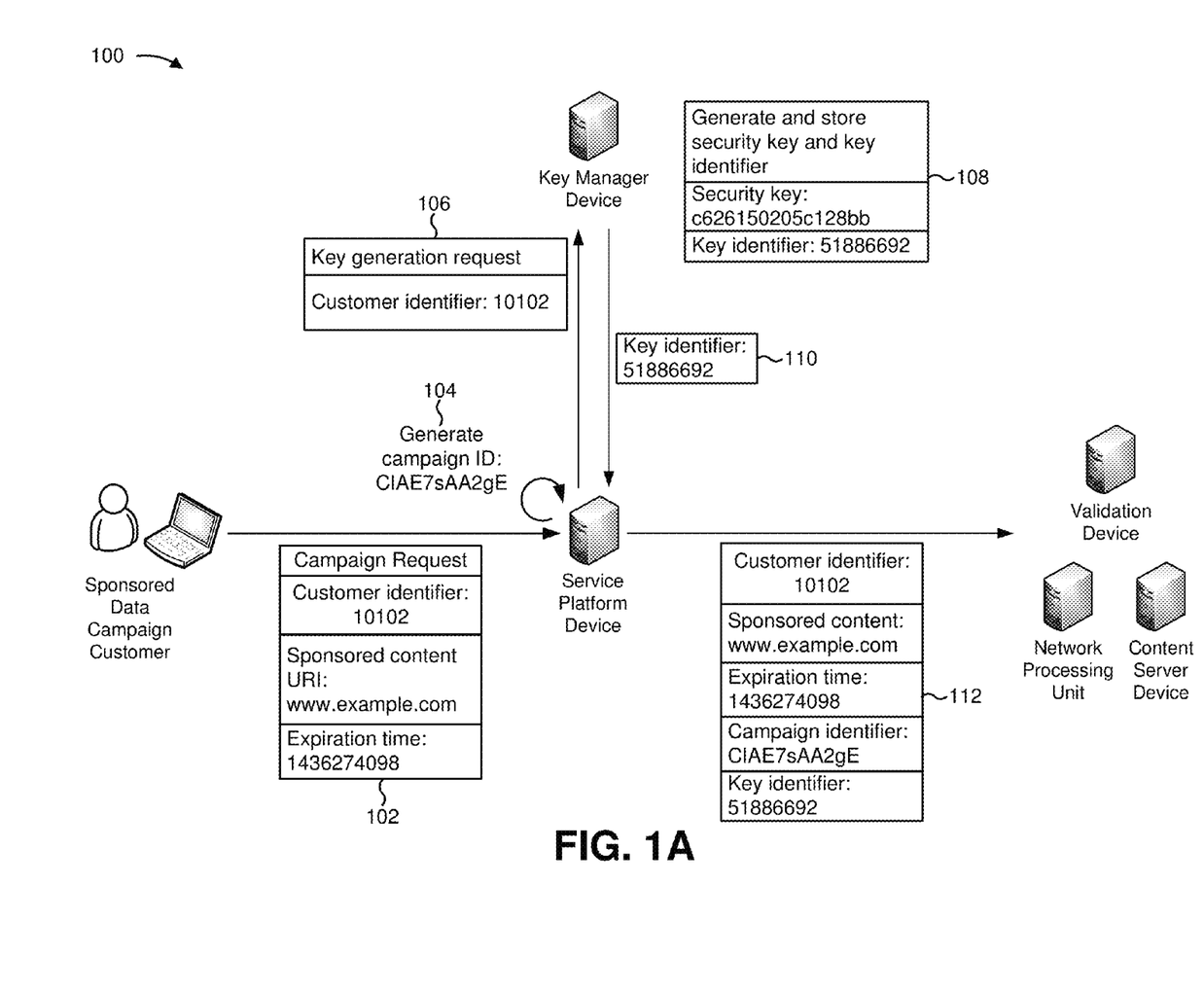
FIGS. 1A-1E are diagrams of an overview of an example implementation described herein.

FIGS. 1A-1E are diagrams of an overview of an example implementation 100 described herein. As shown in FIG. 1A, and by reference number 102, a sponsored data campaign customer may provide a campaign request to a service platform device. The campaign request may request a sponsored data campaign with regard to content (e.g., a webpage, a website, an embedded object, etc.). As further shown, the campaign request may include a customer identifier for the sponsored data customer (e.g., 10102), a network address for the content to sponsor (e.g., a Uniform Resource Identifier (URI) of www.example.com), and an expiration time (e.g., a UNIX time value of 1436274098). As shown by reference number 104, the service platform device may generate a campaign identifier for the sponsored data campaign (e.g., CIAE7sAA2gE). As shown by reference number 106, the service platform device may provide a key generation request to a key manager device, to cause the key manager device to generate a security key for the sponsored data campaign. As further shown, the key generation request may include the customer identifier of 10102.

As shown by reference number 108, the key manager device may generate and store (e.g., in a data structure, such as a database, a table, an array, etc.) the security key and a corresponding key identifier based on the key generation request (e.g., a security key of c626150205c128bb, and a key identifier of 51886692). By generating the security key based on the key generation request, the key manager device conserves storage space that may otherwise be used for unused security keys. In some implementations, the key manager device may generate and store security keys and key identifiers (e.g., automatically, periodically, based on a quantity of stored and unused security keys, etc.), and may assign a stored security key/key identifier pair to the sponsored data campaign. In this way, the key manager device reduces time and processor resource usage to generate the security key based on the key generation request.

In some implementations, the key manager device may store the security key and/or the key identifier in association with the campaign identifier. In this way, the key manager device may obtain and/or provide the security key based on the key identifier or the campaign identifier. As shown by reference number 110, the key manager device may provide the key identifier of 51886692 to the service platform device.

As shown by reference number 112, the service platform device may provide campaign information for the sponsored data campaign to other network devices. Here, the service platform device provides the customer identifier of 10102, the sponsored content of www.example.com, the expiration time of 1436274098, the campaign identifier of CIAE7sAA2gE, and the key identifier of 51886692. As further shown, the service platform device may provide the campaign information to a validation device, a network processing unit, a content server device, or the like.

Figure 1B:
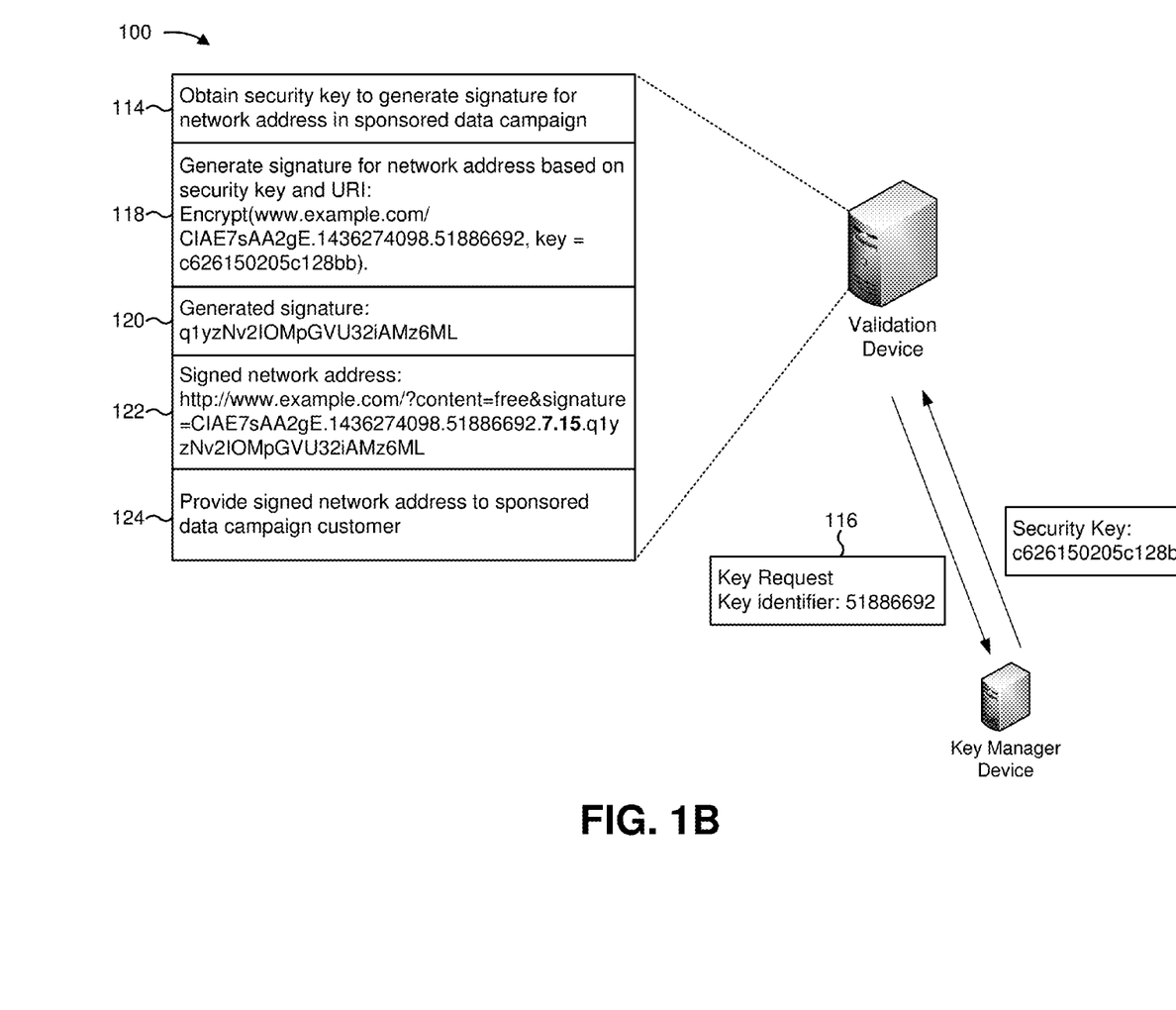

As shown in FIG. 1B, and by reference number 114, the content server device may determine to obtain the security key, in order to generate signatures for the network addresses included in the sponsored data campaign. As shown by reference number 116, to obtain the security key, the validation device may provide a key request to the key manager device. As further shown, the key request may include the key identifier. As shown, based on the key identifier, the key manager device may obtain the security key (e.g., from local storage), and may provide the security key to the validation device.

As shown by reference number 118, the validation device may use a digital signing algorithm to generate a signature for the network address based on the security key and based on the uniform resource identifier (URI) of the sponsored content. Here, the validation device encrypts a string including the URI, the campaign identifier, the expiration time, and the key identifier (e.g., www.example.com/CIAE7sAA2gE.1436274098.5188692). As further shown, the validation device encrypts the string based on the security key (e.g., c626150205c128bb). As shown by reference number 120, the generated signature may include a string of "q1yzNv2IOMpGVU32iAMz6ML."

As shown by reference number 122, the validation device may generate a signed network address based on the network address and the signature (e.g., http://www.example.com/?content=free&signature=CIAE7sAA2gE.1436274098.5188692.7.15.qlyzNv2IOMpGVU32iAMz6ML). As shown, the signed network address includes the URI (e.g., www.example.com), a string indicating that the signed network address is associated with a sponsored data service (e.g., ?content=free), the campaign identifier, the expiration time, and the key identifier.

As further shown, the signed network address includes an offset value of 7 (shown in bold print). The offset value of 7 may identify a quantity of characters in the signed network address that precede the URI for the sponsored content. Here, "http://" precedes the URI for the sponsored content, and "http://" includes 7 characters, so the offset value is 7. As shown, the signed network address includes an object length value of 15 (shown in bold print). The object length value may identify a quantity of characters in the URI for the sponsored content. Here, the URI for the sponsored content is "www.example.com," which includes 15 characters. Therefore, the object length value is 15. The validation device, or another device, may use the offset value and/or the object length value to parse the signed network address when validating the signed network address.

As shown by reference number 124, the validation device may provide the signed network address to the sponsored data campaign customer. The sponsored data campaign customer may configure the sponsored content to be associated with the signed network address. For example, when a user attempts to access the sponsored content (e.g., via a link on a webpage, via a smartphone application, etc.), the user device may transmit a hypertext transfer protocol (HTTP) request to the network that includes the signed network address.

Figure 1C:
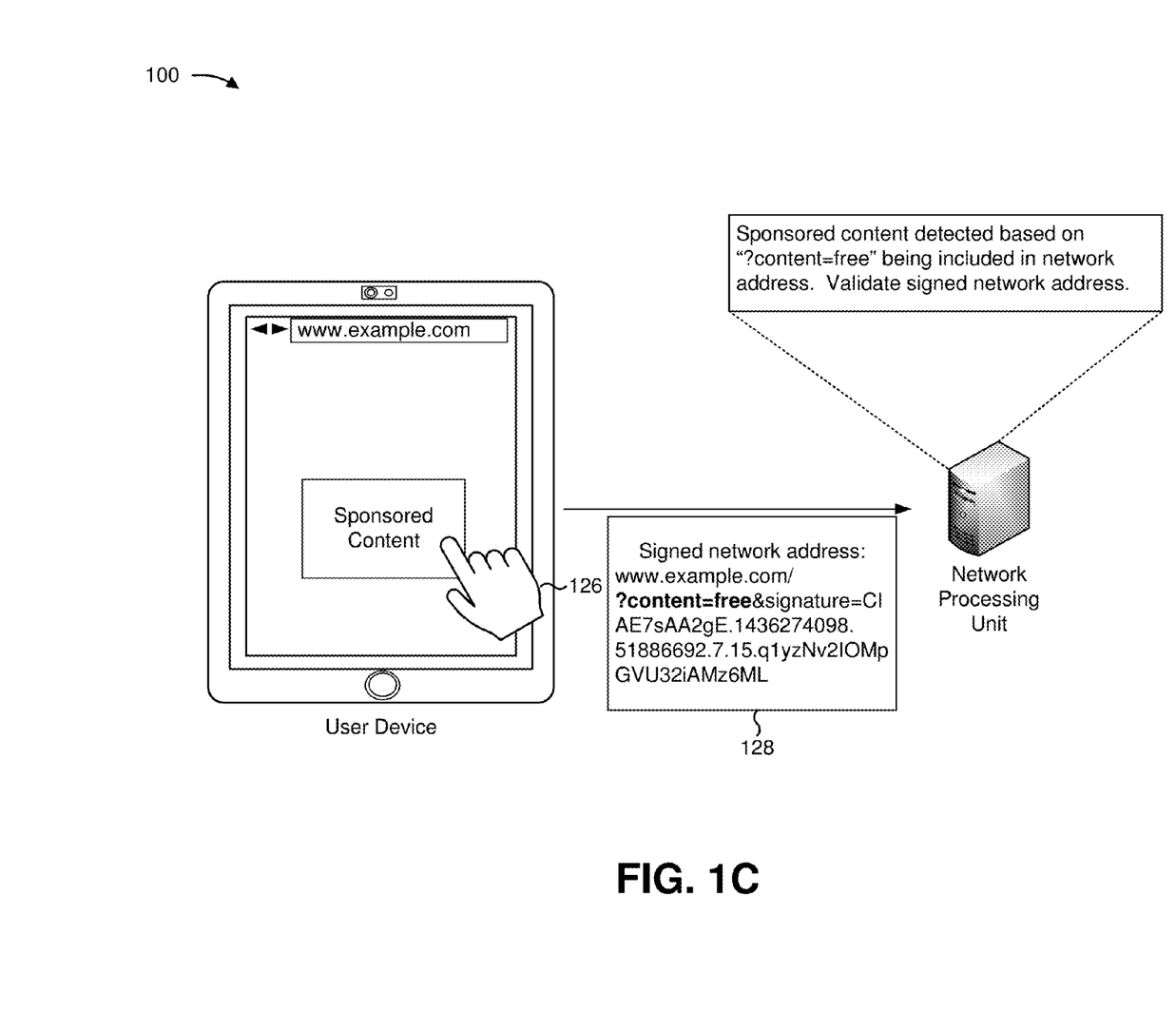

As shown in FIG. 1C, and by reference number 126, a user device may receive an interaction with the sponsored content (e.g., a user interaction, etc.). As shown by reference number 128, based on the interaction, the user device may transmit the signed network address to a network processing unit. In some implementations, the signed network address may be included in an HTTP request, or the like. As further shown, the network processing unit may determine that the signed network address is associated with sponsored content based on a string included in the signed network address (e.g., ?content=free, as shown in bold print). As shown, the network processing unit may determine to perform validation of the signed network address.

Figure 1D:
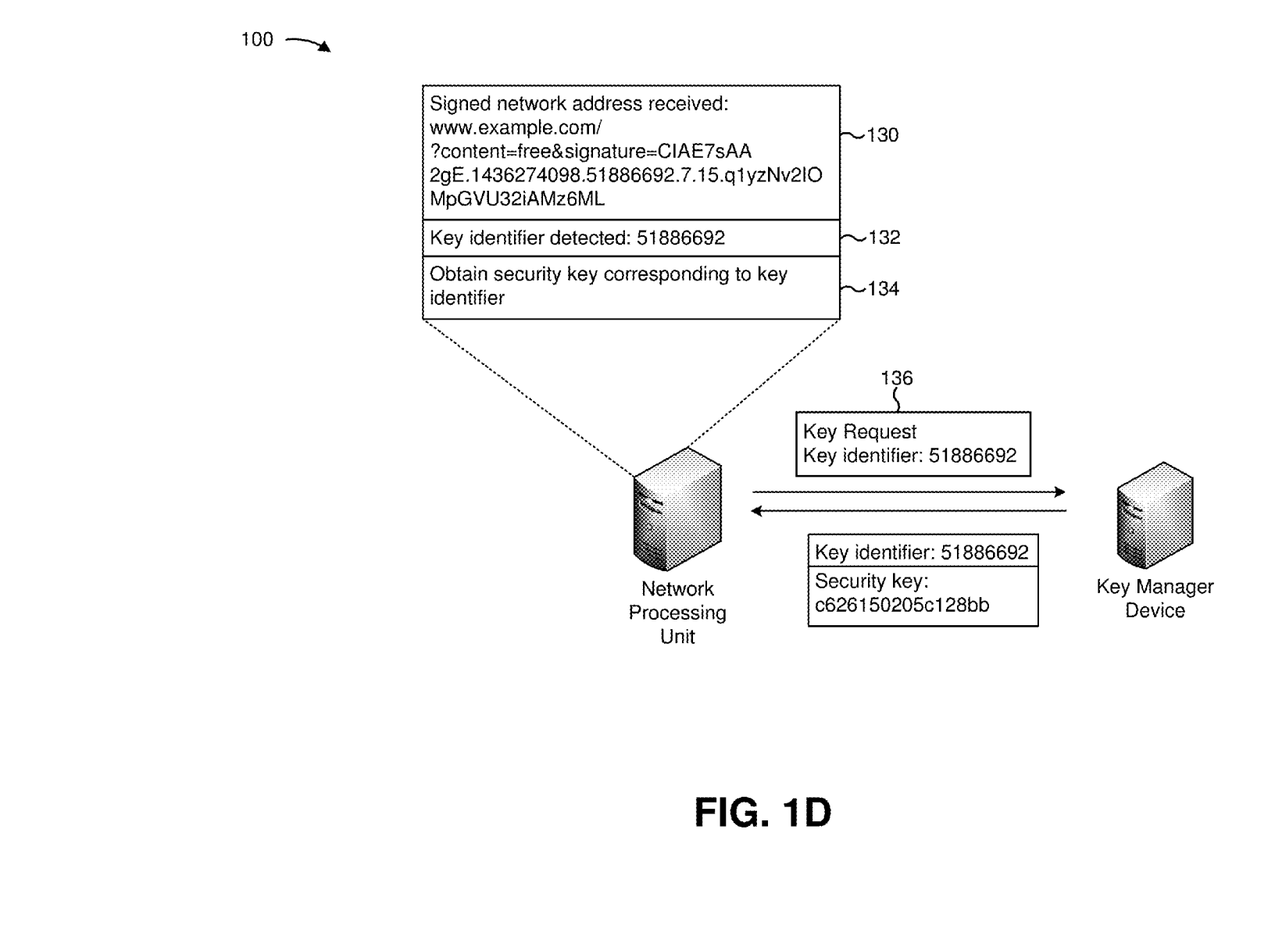

As shown in FIG. 1D, and by reference number 130, the network processing unit may receive the signed network address. As shown by reference number 132, the network processing unit may detect the key identifier in the signed network address. For example, the network processing unit may detect a tag associated with the key identifier, may detect the key identifier based on a location of the key identifier in the signed network address, may detect the key identifier based on a format of the key identifier, or the like.

As shown by reference number 134, the network processing unit may obtain the security key corresponding to the key identifier of 51886692. As shown by reference number 136, to obtain the security key, the network processing unit may provide a key request, which includes the key identifier, to the key manager device. As further shown, based on the key request, the network processing unit may receive the security key from the key manager device.

Figure 1E:
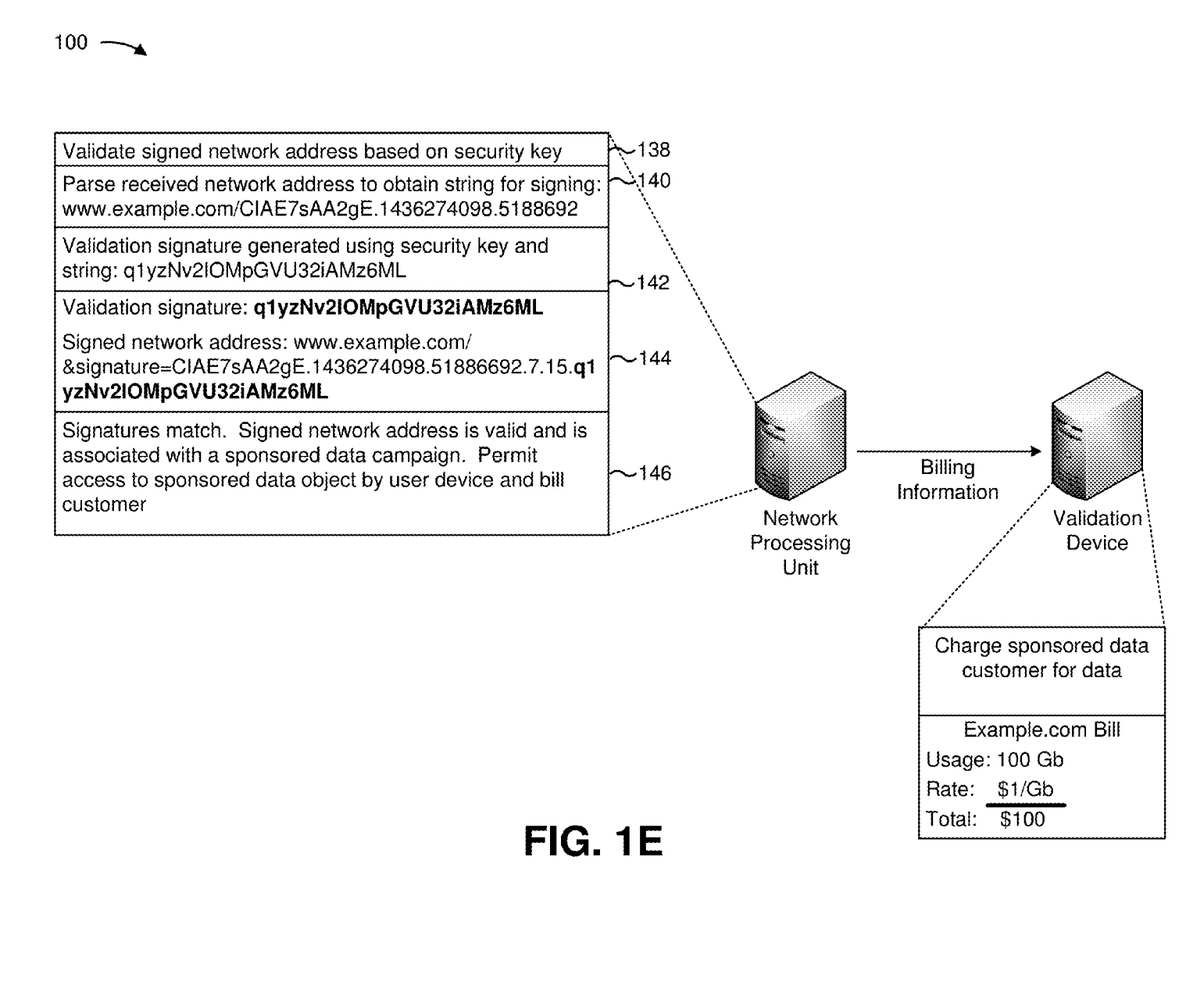

As shown in FIG. 1E, and by reference number 138, the network processing unit may perform a validation operation on the signed network address based on the security key to determine whether the signed network address is valid and associated with a sponsored data campaign. As shown by reference number 140, to perform the validation operation, the network processing unit may obtain the string used to generate the signature. Here, the network processing unit obtains the string by parsing the signed network address. For example, the network processing unit may use the offset value and the object length value to identify the URI for the sponsored content (e.g., www.example.com), and may combine (e.g., append, concatenate, include, etc.) the campaign identifier, the expiration time, and the key identifier with the URI to generate the string. As shown by reference number 142, the network processing unit may generate a validation signature based on the security key and the string (e.g., q1yzNv2IOMpGVU32iAMz6ML).

As shown by reference number 144, the network processing unit may compare the validation signature and the signature that is included in the signed network address (e.g., q1yzNv2IOMpGVU32iAMz6ML, as shown in bold print). As shown by reference number 146, the network processing unit may confirm that the signatures match, and may determine that the signed network address is valid and is associated with the sponsored data campaign. As further shown, based on the signed network address being valid and associated with the sponsored data campaign, the network processing unit may cause a validation device to charge the sponsored data campaign customer (e.g., the sponsored data campaign customer associated with the customer identifier of 10102), not the user associated with the user device.

In this way, the customer may use the service platform device to configure a sponsored data campaign, and the network operator may validate URLs associated with the sponsored data campaign to ensure the URLs are genuine, and to permit a correct party to be charged for the sponsored data campaign.

As indicated above, FIGS. 1A-1E are provided merely as examples. Other examples are possible and may differ from what was described with regard to FIGS. 1A-1E.

Figure 2:
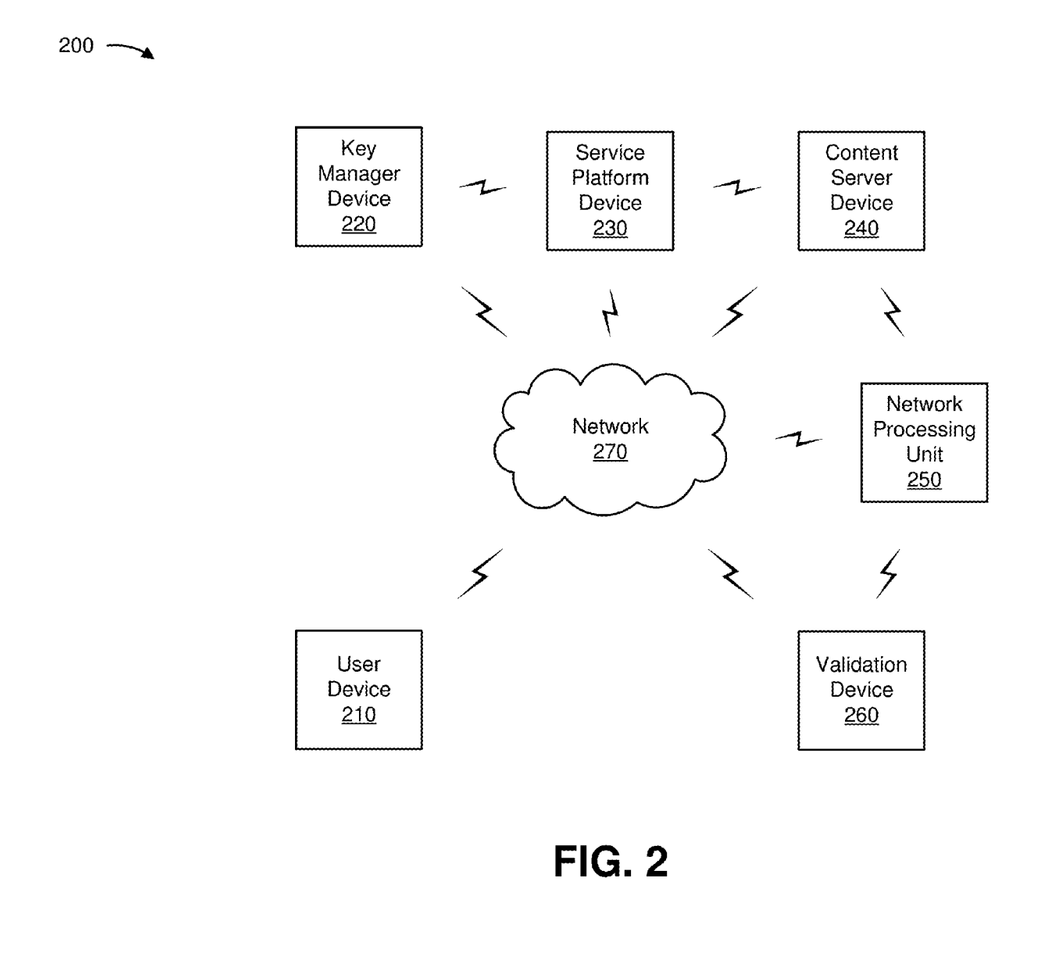
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a key manager device 220, a service platform device 230, a content server device 240, a network processing unit 250, a validation device 260, and a network 270. Devices of environment 200 may interconnect via wired connections, wireless connections, or a combination of wired and wireless connections.

User device 210 may include one or more devices capable of receiving, generating, storing, processing, and/or providing information. For example, user device 210 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device. In some implementations, user device 210 may receive information from and/or transmit information to another device in environment 200.

Key manager device 220 may include one or more devices capable of generating, storing, processing, deleting, and/or providing a security key and/or information associated with a security key. For example, key manager device 220 may include a computing device, such as a server or a similar device. A session time record may refer to a record relating to one or more time periods during which user device 210 accessed sponsored data.

Service platform device 230 may include one or more devices capable of receiving, generating, storing, processing, and/or providing information. For example, service platform device 230 may include a computing device, such as a server (e.g., a content server, a web server, an application server, etc.) or a similar device.

Content server device 240 may include one or more devices that provide content. For example, content server device 240 may include a website host (e.g., a device that provides one or more websites). In some implementations, content server device 240 may include a repository of content for inclusion in one or more pages. For example, content server device 240 may store and/or provide an image, an audio file, a video file, a script, an advertisement, or the like. In some implementations, content server device 240 may receive information from and/or transmit information to another device in environment 200.

Network processing unit 250 may include one or more processors capable of receiving, processing, storing, and/or transferring traffic associated with network 270. For example, network processing unit 250 may include a server, a gateway, a firewall, a router, or a similar device. In some implementations, network processing unit 250 may manage session time records. A session time record may refer to a record relating to one or more time periods during which user device 210 accessed sponsored data. In some implementations, network processing unit 250 may receive information from and/or transmit information to another device in environment 200.

Validation device 260 may include one or more devices capable of receiving, storing, processing, and/or providing information. For example, validation device 260 may include a computing device, such as a server, or a similar device. In some implementations, validation device 260 may manage session time records. In some implementations, validation device 260 may receive information from and/or transmit information to another device in environment 200.

Network 270 may include one or more wired and/or wireless networks. For example, network 270 may include a cellular network (e.g., a code division multiple access (CDMA) network, a long term evolution (LTE) network, etc.), a public land mobile network (PLMN), a local area network (LAN), a wide area network (WAN), a metropolitan area network (MAN), a telephone network (e.g., the Public Switched Telephone Network (PSTN)), a near field communication (NFC) network, an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
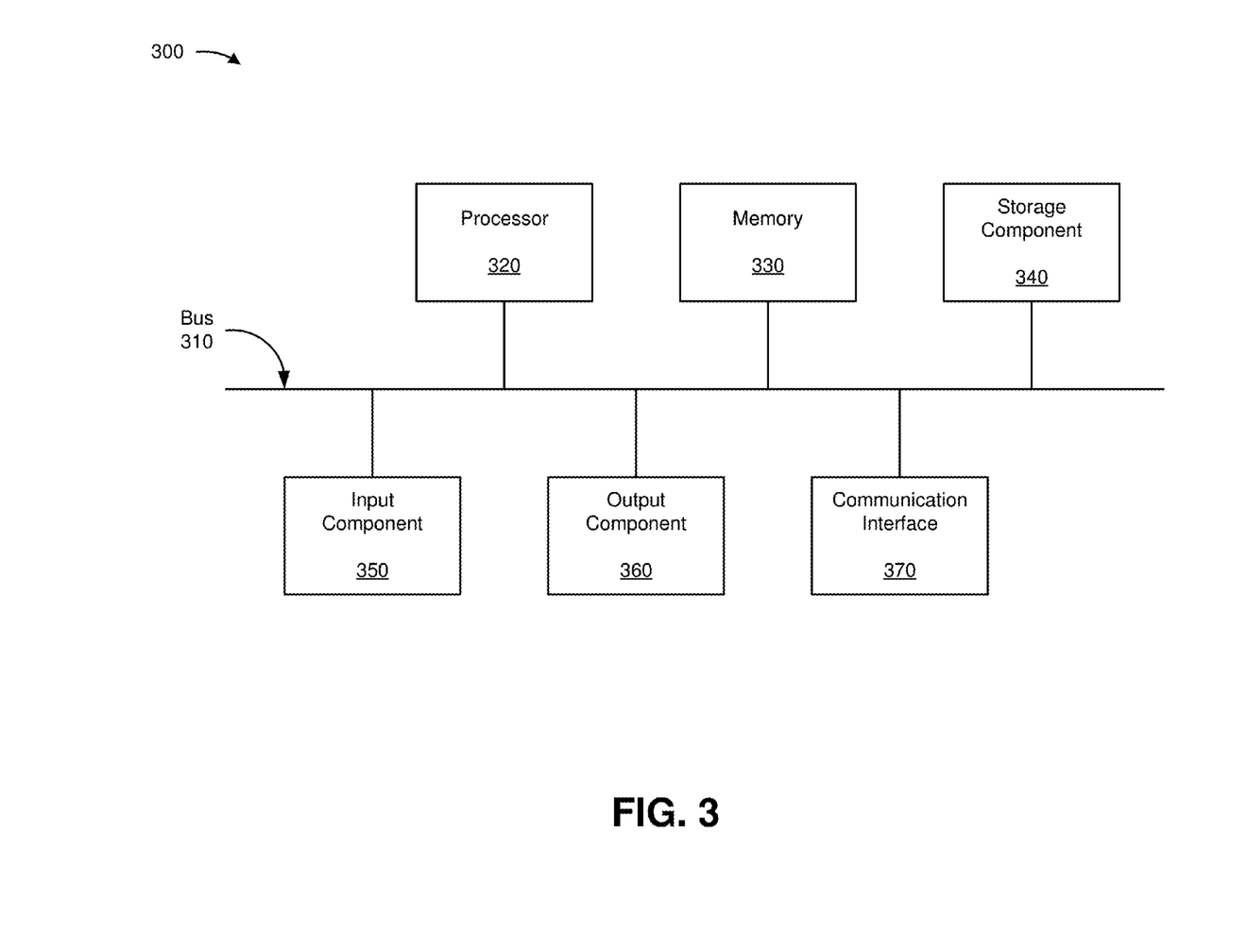
FIG. 3 is a diagram of example components of one or more devices of FIG. 2.

FIG. 3 is a diagram of example components of a device 300. Device 300 may correspond to user device 210, key manager device 220, service platform device 230, content server device 240, network processing unit 250, and/or validation device 260. In some implementations, user device 210, key manager device 220, service platform device 230, content server device 240, network processing unit 250, and/or validation device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
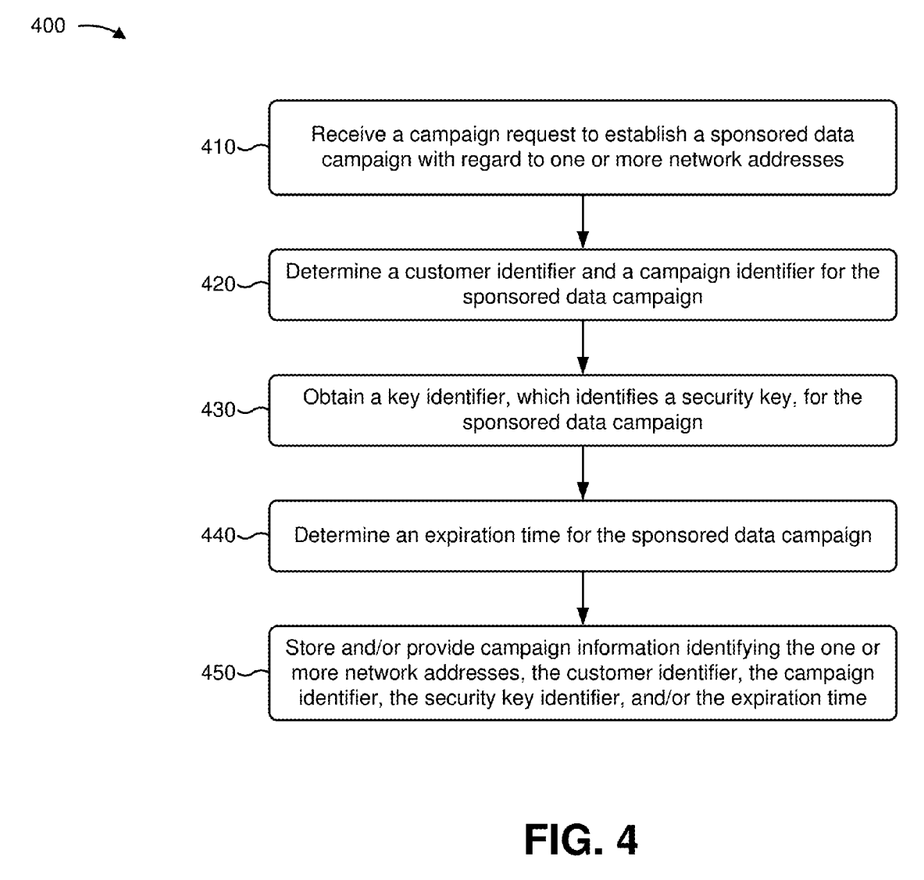
FIG. 4 is a flow chart of an example process for configuring a sponsored data campaign.

FIG. 4 is a flow chart of an example process 400 for configuring a sponsored data campaign. In some implementations, one or more process blocks of FIG. 4 may be performed by service platform device 230. In some implementations, one or more process blocks of FIG. 4 may be performed by another device or a group of devices separate from or including service platform device 230, such as user device 210, key manager device 220, content server device 240, network processing unit 250, and/or validation device 260.

As shown in FIG. 4, process 400 may include receiving a campaign request to establish a sponsored data campaign with regard to one or more network addresses (block 410). For example, service platform device 230 may receive a campaign request to establish a sponsored data campaign for a customer. The campaign request may identify one or more network addresses (e.g., a URL, a uniform resource identifier (URI), an Internet Protocol (IP) address, a network port, an email address, etc.) that may be associated with content to be provided in the sponsored data campaign (e.g., content to be provided by content server device 240, etc.).

Service platform device 230 may receive the campaign request from a customer. The customer may subsidize data costs associated with accessing content identified by the one or more network addresses via network 270. For example, the customer may pay bills accrued by user devices 210 for accessing the content identified by the one or more network addresses.

As further shown in FIG. 4, process 400 may include determining a customer identifier and a campaign identifier for the sponsored data campaign (block 420). For example, service platform device 230 may determine a customer identifier and a campaign identifier for the sponsored data campaign. The customer identifier may include a string of characters of any length that identifies a customer that is to pay for the sponsored data campaign. The campaign identifier may include a string of characters of any length that identifies the sponsored data campaign. In some implementations, the customer may provide the customer identifier and/or the campaign identifier (e.g., with the campaign request). In this way, service platform device 230 may associate a sponsored data campaign with a particular customer identifier, which reduces processor resource usage for accessing information relating to the customer and/or the sponsored data campaign.

In some implementations, service platform device 230 may generate the customer identifier and/or the campaign identifier. For example, service platform device 230 may receive a campaign request from a customer who is not associated with a customer identifier. Service platform device 230 may determine that the customer is not associated with a customer identifier, and may generate a customer identifier for the customer. Additionally, or alternatively, service platform device 230 may generate a campaign identifier. For example, service platform device 230 may receive campaign information for configuring a sponsored data campaign, and may generate a campaign identifier for the sponsored data campaign. In some implementations, the campaign identifier may be unique (e.g., not shared by two or more sponsored data campaigns).

As further shown in FIG. 4, process 400 may include obtaining a key identifier, which identifies a security key, for the sponsored data campaign (block 430). For example, service platform device 230 may obtain a key identifier. The key identifier may identify a security key. A network device (e.g., service platform device 230, content server device 240, validation device 260, etc.) may use the security key to sign the one or more network addresses associated with the sponsored data campaign. To sign the one or more network addresses, the network device may obtain the security key (e.g., by requesting the security key from key manager device 220 based on the key identifier), as described in more detail below.

As further shown in FIG. 4, process 400 may include determining an expiration time for the sponsored data campaign (block 440). For example, service platform device 230 may determine an expiration time for the sponsored data campaign. In some implementations, service platform device 230 may receive information identifying the expiration time. For example, the customer may provide information identifying the expiration time in the campaign request. Additionally, or alternatively, service platform device 230 may determine the expiration time. For example, service platform device 230 may use a default value for the expiration time, may determine the expiration time based on a type of content included in the sponsored data campaign, may determine the expiration time based on an amount of credit associated with an account of the customer, or the like. The expiration time may include a date and/or time (e.g., a UNIX time value, a day/month/year value, a time of day, etc.). The expiration time may identify a length of time for which the sponsored data campaign is valid.

In some implementations, service platform device 230 may determine an expiration quantity for the sponsored data campaign. An expiration quantity may identify a particular quantity of instances (e.g., a quantity of user devices 210 accessing the content, a quantity of subscribers accessing the content, a quantity of downloads of the content, etc.) on which to provide access to the sponsored data. Based on the expiration quantity, service platform device 230 may selectively permit or deny access to the sponsored data.

As further shown in FIG. 4, process 400 may include storing and/or providing campaign information identifying the one or more network addresses, the customer identifier, the campaign identifier, the security key identifier, and/or the expiration time (block 450). For example, service platform device 230 may store and/or provide campaign information identifying the one or more network addresses, the customer identifier, the campaign identifier, the security key identifier, and/or the expiration time.

In some implementations, service platform device 230 may provide the campaign information for use to sign the one or more network addresses. Additionally, or alternatively, service platform device 230 may provide the campaign information to permit another device (e.g., network processing unit 250, validation device 260, etc.) to validate a signed network address and/or to control access to the sponsored data based on validating the signed network address. Additionally, or alternatively, service platform device 230 may provide the campaign information for billing purposes (e.g., for use to bill the customer or user device 210 based on validating the signed network address and/or based on usage of the content associated with the sponsored data campaign).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
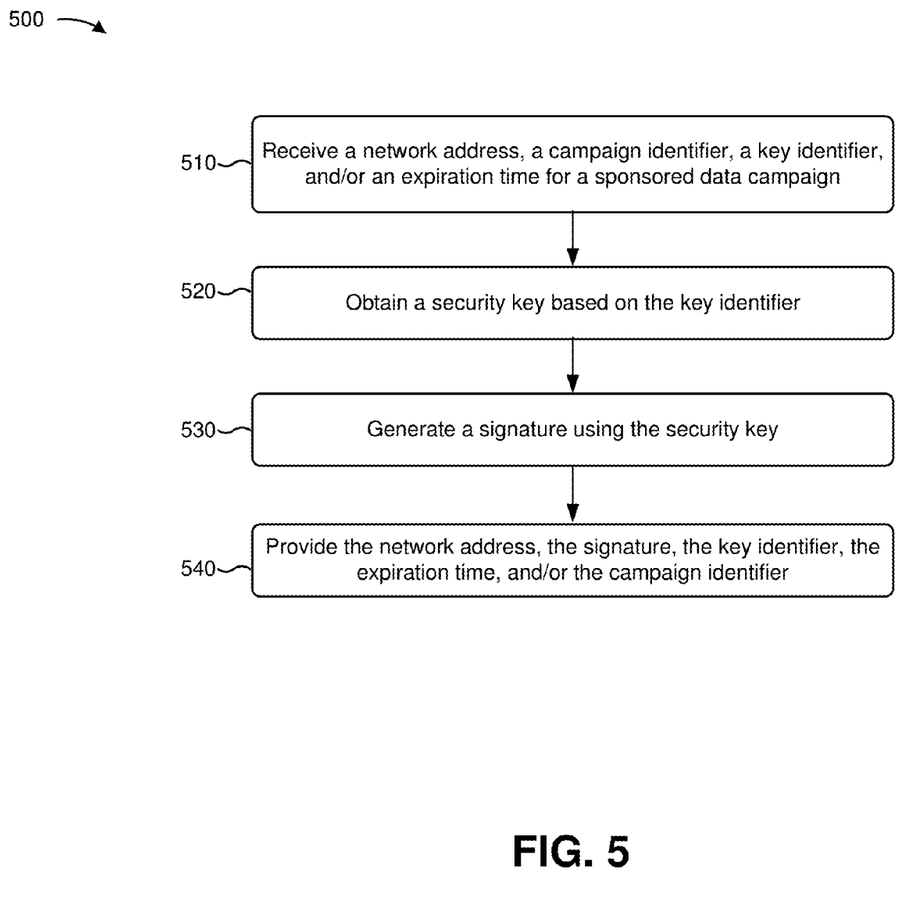
FIG. 5 is a flow chart of an example process for signing a network address for a sponsored data campaign.

FIG. 5 is a flow chart of an example process 500 for generating a signature based on a network address for a sponsored data campaign. In some implementations, one or more process blocks of FIG. 5 may be performed by validation device 260. In some implementations, one or more process blocks of FIG. 5 may be performed by another device or a group of devices separate from or including validation device 260, such as user device 210, key manager device 220, service platform device 230, content server device 240, and/or network processing unit 250.

As shown in FIG. 5, process 500 may include receiving a network address, a campaign identifier, a key identifier, and/or an expiration time for a sponsored data campaign (block 510). For example, validation device 260 may receive a network address, a campaign identifier, a key identifier, and/or an expiration time for a sponsored data campaign. In some implementations, validation device 260 may receive the network address, the campaign identifier, the key identifier, and/or the expiration time from service platform device 230. For example, service platform device 230 may configure a sponsored data campaign, and may provide information relating to the sponsored data campaign. Validation device 260 may receive the network address, the campaign identifier, the key identifier, and/or the expiration time in order to sign the one or more network addresses, as described in more detail below.

In some implementations, another device may receive the campaign information in order to sign the one or more network addresses. For example, a first device (e.g., validation device 260, etc.) may sign network addresses that are associated with webpages to be transmitted via an HTTP connection, and a second device (e.g., content server device 240, etc.) may sign network addresses that are associated with webpages to be transmitted via an HTTPS connection. In this way, the device improves security of network 270 by supporting HTTPS for network traffic.

As further shown in FIG. 5, process 500 may include obtaining a security key based on the key identifier (block 520). For example, validation device 260 may obtain a security key based on the key identifier. Validation device 260 may obtain the security key by providing the key identifier to key manager device 220. Key manager device 220 may provide the security key associated with the key identifier. In some implementations, validation device 260 may obtain the security key by providing other information to key manager device 220 (e.g., a campaign identifier, a customer identifier, etc.).

As further shown in FIG. 5, process 500 may include generating a signature using the security key (block 530). For example, validation device 260 may generate a signature using the security key. In some implementations, validation device 260 may generate the signature based on a string relating to the network address. The string may include, for example, the network address, the expiration time, the campaign identifier, the key identifier, or other information. Validation device 260 may apply a digital signature algorithm (e.g., an advanced encryption standard (AES) algorithm, a keyed-hash message authentication code (HMAC) algorithm, or the like) to the string based on the security key to generate the signature. In some implementations, validation device 260 may use the signature to sign the network address. Additionally, or alternatively, another device (e.g., service platform device 230, content server device 240, network processing unit 250, etc.) may use the digital signature algorithm to sign the network address using the security key.

As further shown in FIG. 5, process 500 may include providing the network address, the signature, the key identifier, the expiration time, and/or the campaign identifier (block 540). For example, validation device 260 may provide the network address, the signature, the key identifier, the expiration time, and/or the campaign identifier. In some implementations, validation device 260 may generate a signed network address (e.g., may sign the network address) based on the network address, the signature, the key identifier, the expiration time, and/or the campaign identifier, as described in more detail in connection with FIG. 1B, above.

In some implementations, validation device 260 may provide a signed network address to the customer. The customer may associate the signed network address with content to be included in the sponsored data campaign (e.g., a website, a webpage, an application, an embedded object on a webpage, an audio recording, a video recording, a data set, etc.). When a user interacts with the sponsored content, validation device 260 or another device (e.g., content server device 240, network processing unit 250, etc.) may detect the signed network address, and may validate the signed network address based on the signature included in the signed network address, as described in more detail in connection with FIG. 6, below. In this way, validation device 260 improves network security for the sponsored data campaign by validating the signed network address based on the security key.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
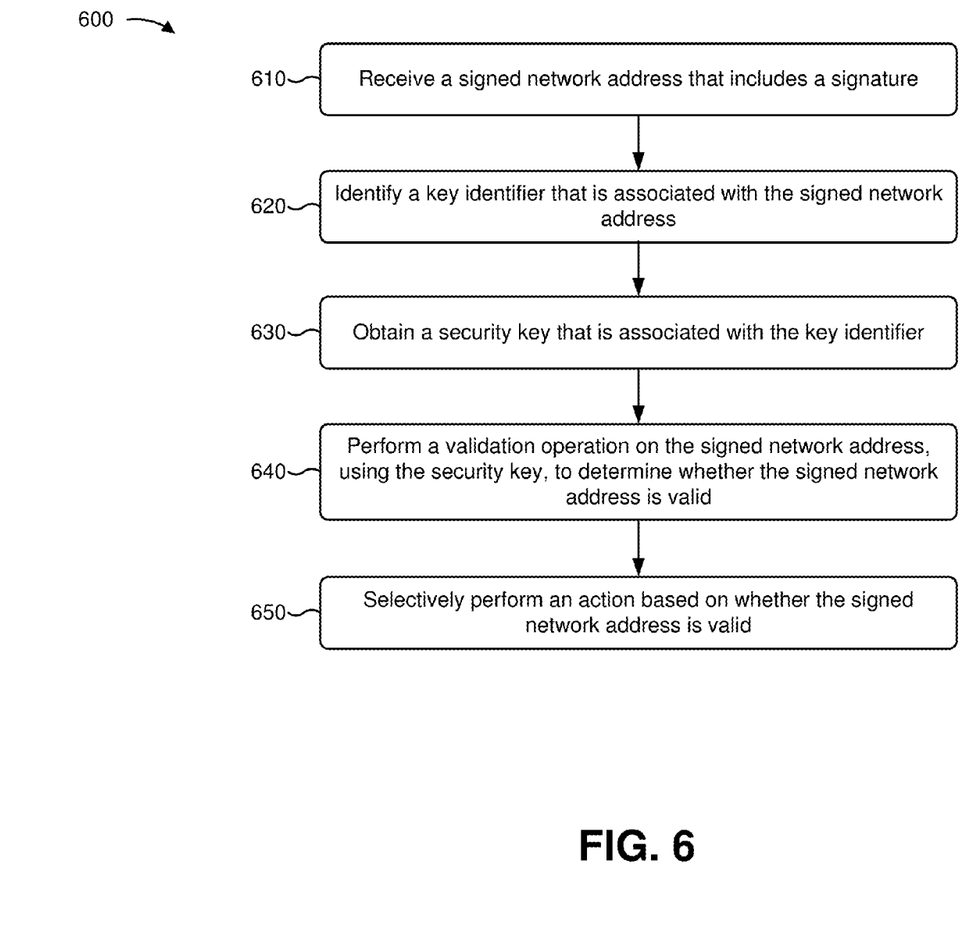
FIG. 6 is a flow chart of an example process for validating a signed network address for a sponsored data campaign.

FIG. 6 is a flow chart of an example process 600 for validating a signed network address for a sponsored data campaign. In some implementations, one or more process blocks of FIG. 6 may be performed by network processing unit 250. In some implementations, one or more process blocks of FIG. 6 may be performed by another device or a group of devices separate from or including network processing unit 250, such as user device 210, key manager device 220, service platform device 230, content server device 240, and/or validation device 260.

As shown in FIG. 6, process 600 may include receiving a signed network address that includes a signature (block 610). For example, network processing unit 250 may receive a network address that includes a signature. Network processing unit 250 may receive the signed network address based on user device 210 accessing content that is associated with a sponsored data campaign. For example, the content may include a webpage with a URL that includes the signed network address. When user device 210 transmits a request for the webpage, network processing unit 250 may receive the signed network address (e.g., based on user device 210 transmitting the request to/via network processing unit 250). In some implementations, the signed network address may include information identifying the content as being associated with the sponsored data campaign. For example, the signed network address may include a particular string (e.g., ?content=free, as shown in FIG. 1B, or the like), or the like.

As further shown in FIG. 6, process 600 may include identifying a key identifier that is associated with the signed network address (block 620). For example, network processing unit 250 may identify a key identifier that is associated with the signed network address. In some implementations, the key identifier may be included in the signed network address, as described in more detail in connection with FIG. 1B, above. Additionally, or alternatively, network processing unit 250 may obtain the key identifier based on the signed network address. For example, another device may store the key identifier, and network processing unit 250 may obtain the key identifier based on information included in the signed network address (e.g., a campaign identifier, a customer identifier, etc.).

As further shown in FIG. 6, process 600 may include obtaining a security key that is associated with the key identifier (block 630). For example, network processing unit 250 may obtain a security key that is associated with the key identifier. Network processing unit 250 may obtain the security key by providing the key identifier to key manager device 220, as described in more detail in connection with FIGS. 1A-1E. Additionally, or alternatively, validation device 260 may obtain the security key based on other information that is included in the network address (e.g., a campaign identifier, a customer identifier, etc.).

As further shown in FIG. 6, process 600 may include performing a validation operation on the signed network address, using the security key, to determine whether the signed network address is valid (block 640). For example, network processing unit 250 may perform a validation operation on the signed network address, using the security key, to determine whether the signed network address is valid (e.g., uncorrupted, untampered, correctly generated, etc.).

In some implementations, network processing unit 250 may generate a validation signature using the security key, and may compare the validation signature to a received signature that is included in the signed network address. For example, the signed network address may include information used to generate the received signature (e.g., a network address for content, a campaign identifier, an expiration time, a key identifier, etc.). Based on the information used to generate the received signature, network processing unit 250 may generate a validation signature. For example, network processing unit 250 may obtain a security key based on the key identifier, and may apply a digital signature algorithm to the security key and the information used to generate the received signature. The digital signature algorithm may generate the validation signature.

When the received signature and the validation signature match, network processing unit 250 may determine that the signed network address is valid. When the received signature and the validation signature do not match, network processing unit 250 may determine that the signed network address is invalid. The signed network address may be invalid based on, for example, the signed network address being tampered with by a malicious party, the signed network address being corrupted, the signed network address being generated incorrectly (e.g., based on using the wrong security key, the wrong expiration date, etc.), the signed network address being forged, or the like. Network processing unit 250 may perform an action based on whether the signed network address is valid, as described in more detail below.

As further shown in FIG. 6, process 600 may include selectively performing an action based on whether the signed network address is valid (block 650). For example, network processing unit 250 may selectively perform an action based on whether the signed network address is valid. In some implementations, network processing unit 250 may provide information to another device. For example, when the signed network address is valid, network processing unit 250 may provide information to validation device 260 indicating to authorize user device 210 to access the content, indicating to bill the customer instead of user device 210, usage information for the content, or the like. When the signed network address is invalid, network processing unit 250 may provide information indicating to deny user device 210 access to the content, indicating to bill user device 210, usage information for the content, or the like.

In some implementations, network processing unit 250 may permit or deny user device 210 access to content based on validating the signed network address. For example, if network processing unit 250 determines that the signed network address is valid, network processing unit 250 may permit user device 210 to access the content associated with the signed network address. If network processing unit 250 determines that the signed network address is invalid, network processing unit 250 may not permit user device 210 to access the content. In this way, network processing unit 250 controls access to content associated with a sponsored data campaign based on validating a signed network address, which improves network security and reduces a likelihood that an unauthorized party access the sponsored data campaign.

In some implementations, network processing unit 250 may permit or deny access to sponsored data based on an expiration time. For example, if the expiration time included in the signed network address has expired, network processing unit 250 may deny user device 210 access to a sponsored data campaign or may bill user device 210 for data used when accessing the sponsored data campaign. Additionally, or alternatively, network processing unit 250 may permit or deny access to sponsored data based on an expiration quantity. For example, if an expiration quantity included in the signed network address has been met or exceeded, network processing unit 250 may deny user device 210 access to a sponsored data campaign or may bill user device 210 for data used when accessing the sponsored data campaign.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Implementations described herein permit a network operator to provide secure access to sponsored content, and assist a service provider to prevent unwanted parties from accessing the sponsored content.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a network address and a signature,
the network address being associated with a sponsored data campaign for subsidizing a user to access content associated with the network address, and
the signature being generated based on a security key and based on the network address;
perform a validation operation on the signature to validate that the network address is associated with the sponsored data campaign,
the validation operation being performed based on the security key,
the security key being obtained based on a key identifier;
selectively permit or deny access to the content associated with the network address based on a result of the validation operation;
determine whether to bill a first party or a second party for data usage associated with the sponsored data campaign based on performing the validation operation,
the first party being the user; and
provide information that identifies whether to bill the first party or the second party for the data usage associated with the sponsored data campaign.

2. The device of claim 1, where the one or more processors, when receiving the network address, are to:
receive at least one of:
a campaign identifier that identifies the sponsored data campaign, or
an expiration time for the sponsored data campaign; and
perform the validation operation based on the campaign identifier, the expiration time, or the key identifier.

3. The device of claim 2, where the one or more processors are further to:
receive campaign information identifying a sponsored data campaign customer or identifying the network address;
provide the campaign information to a key manager device; and
receive the key identifier from the key manager device.

4. The device of claim 2, where the one or more processors are further to:
generate the signature based on the network address, the campaign identifier, the expiration time, or the key identifier; and
provide the signature and the network address to a sponsored data campaign customer.

5. The device of claim 2, where the one or more processors are further to:
search a data structure using the key identifier; and
obtain the security key based on searching the data structure.

6. The device of claim 1,
where the signature is a received signature; and
where the one or more processors, when performing the validation operation, are to:
create a validation signature, using the security key, to determine whether the received signature is valid;
compare the validation signature and the received signature; and
determine whether the received signature is valid based on comparing the validation signature and the received signature.

7. The device of claim 1, where the user is a user of a user device that is attempting to access the content.

8. A non-transitory computer-readable medium storing instructions, the instructions comprising:
one or more instructions that, when executed by one or more processors, cause the one or more processors to:
receive a network address and a signature,
the network address being associated with a sponsored data campaign for subsidizing a user to access content associated with the network address, and
the signature being generated based on the network address;
perform a validation operation on the signature to validate that the network address is associated with the sponsored data campaign,
the validation operation being performed based on a security key associated with the network address,
the security key being obtained based on a key identifier received in association with the network address;
selectively permit or deny access to the content associated with the network address based on a result of the validation operation;
determine whether to bill a first party or a second party for data usage associated with the sponsored data campaign based on performing the validation operation,
the first party being the user; and
provide information that identifies whether to bill the first party or the second party for the data usage associated with the sponsored data campaign.

9. The non-transitory computer-readable medium of claim 8,
where the signature is a received signature; and
where the one or more instructions, that cause the one or more processors to perform the validation operation, cause the one or more processors to:

create a validation signature, using the security key, to determine whether the received signature is valid;
compare the validation signature and the received signature; and
determine whether the received signature is valid based on comparing the validation signature and the received signature.

10. The non-transitory computer-readable medium of claim 9, where the one or more instructions, that cause the one or more processors to create the validation signature, cause the one or more processors to:
create the validation signature using a digital signature algorithm and based on a campaign identifier, an expiration time, or the key identifier,
the campaign identifier identifying the sponsored data campaign, and
the campaign identifier and the expiration time being received with the network address.

11. The non-transitory computer-readable medium of claim 8, where the one or more instructions, that cause the one or more processors to receive the network address and the signature, cause the one or more processors to:
receive the network address and the signature based on a user device attempting to access the content.

12. The non-transitory computer-readable medium of claim 8, where the signature is created based on:
campaign information received from a sponsored data campaign customer,
the campaign information including one or more of a customer identifier, a campaign identifier, or an expiration time,
the security key, and
a digital signature algorithm.

13. The non-transitory computer-readable medium of claim 12, where the one or more instructions, when executed by the one or more processors, further cause the one or more processors to:
cause the security key and the key identifier to be generated based on receiving the campaign information.

14. The non-transitory computer-readable medium of claim 8, where the one or more instructions, that cause the one or more processors to receive the network address, cause the one or more processors to:
receive an expiration time that identifies a length of time for which the sponsored data campaign is valid; and
where the one or more instructions, that cause the one or more processors to determine whether the signature is valid, cause the one or more processors to:
determine whether the signature is valid based on the expiration time.

15. A method, comprising:
receiving, by a device, a network address and a signature,
the network address being associated with a sponsored data campaign for subsidizing a user to access content associated with the network address, and
the signature being generated based on the network address;
performing, by the device, a validation operation on the signature to validate that the network address is associated with the sponsored data campaign,
the validation operation being performed based on a security key associated with the network address,
the security key being obtained based on a key identifier received in association with the network address;
selectively permitting or denying, by the device, access to the content associated with the network address based on a result of the validation operation;
determining whether to bill a first party or a second party for data usage associated with the sponsored data campaign based on performing the validation operation,
the first party being the user; and
providing information that identifies whether to bill the first party or the second party for the data usage associated with the sponsored data campaign.

16. The method of claim 15,
where the signature is a received signature; and
where performing the validation operation comprises:
creating a validation signature, using the security key, to determine whether the received signature is valid;
comparing the validation signature and the received signature; and
determining whether the received signature is valid based on comparing the validation signature and the received signature.

17. The method of claim 15, further comprising:
generating the signature based on the network address, a campaign identifier, an expiration time, and the key identifier,
the campaign identifier identifying the sponsored data campaign, and
the expiration time identifying a time at which the sponsored data campaign is no longer valid.

18. The method of claim 17, further comprising:
generating a signed network address that includes the network address, the key identifier, the campaign identifier, the expiration time, and the signature; and
providing the signed network address to a customer associated with the sponsored data campaign.

19. The method of claim 15, further comprising:
causing the security key and the key identifier to be generated.

20. The method of claim 15, where the user is a user of a user device that is attempting to access the content.

* * * * *